United States Patent [19]

Schuermann

[11] Patent Number: 5,287,112
[45] Date of Patent: Feb. 15, 1994

[54] HIGH SPEED READ/WRITE AVI SYSTEM

[75] Inventor: Josef H. Schuermann, Oberhummel, Fed. Rep. of Germany

[73] Assignee: Texas Instruments Incorporated, Dallas, Tex.

[21] Appl. No.: 48,541

[22] Filed: Apr. 14, 1993

[51] Int. Cl.⁵ .............................................. G01S 13/74
[52] U.S. Cl. ........................................ 342/42; 342/51
[58] Field of Search .................................. 342/42, 51

[56] References Cited

U.S. PATENT DOCUMENTS

| | | |
|---|---|---|
| 3,689,885 | 9/1972 | Kaplan et al. ............... 342/42 X |
| 4,042,970 | 8/1977 | Atkins ............................ 342/42 X |
| 4,713,148 | 1/1973 | Cardullo et al. ................... 342/42 |
| 4,912,471 | 3/1990 | Tyburski et al. .................. 342/42 |
| 4,926,182 | 5/1990 | Ohta et al. .................... 342/51 X |
| 4,963,887 | 10/1990 | Kawashima et al. ............ 342/42 X |
| 5,053,774 | 10/1991 | Schuerman et al. .............. 342/44 |
| 5,073,781 | 12/1991 | Stickelbrocks .................... 342/51 |

OTHER PUBLICATIONS

U.S. application Ser. No. 07/981,635, Meier et al.

Primary Examiner—Mark Hellner
Attorney, Agent, or Firm—Brian C. McCormack; James C. Kesterson; Richard L. Donaldson

[57] ABSTRACT

A transponder (14) for communicating with an interrogator (12) has a high Q-factor resonant circuit (34) of frequency $f_1$ for receiving RF powering signals. The transponder also has a tuning circuit (56,58) which when in electrical communication with the resonant circuit (34) is operable to form a lower Q-factor resonant circuit (60) of frequency $f_3$ for receiving RF communications from the interrogator unit. The transponder also includes a demodulator (66) which is in electrical communication with said resonant circuit (34). Additionally, the transponder (14) also included a control circuit (40) which receives a demodulated data signal from the demodulator (66). The control circuit (40) is further connected to the tuning circuit (56,58) and is operable to connect the tuning circuit (56,58) to the high Q-factor resonant circuit (34) in order to form the lower Q-factor resonant circuit (60). Control circuit (40) also converts the RF powering signals to a DC current for storing energy. The energy is stored in an energy storage device such as a storage capacitor (46). Other devices, methods and systems are disclosed.

16 Claims, 1 Drawing Sheet

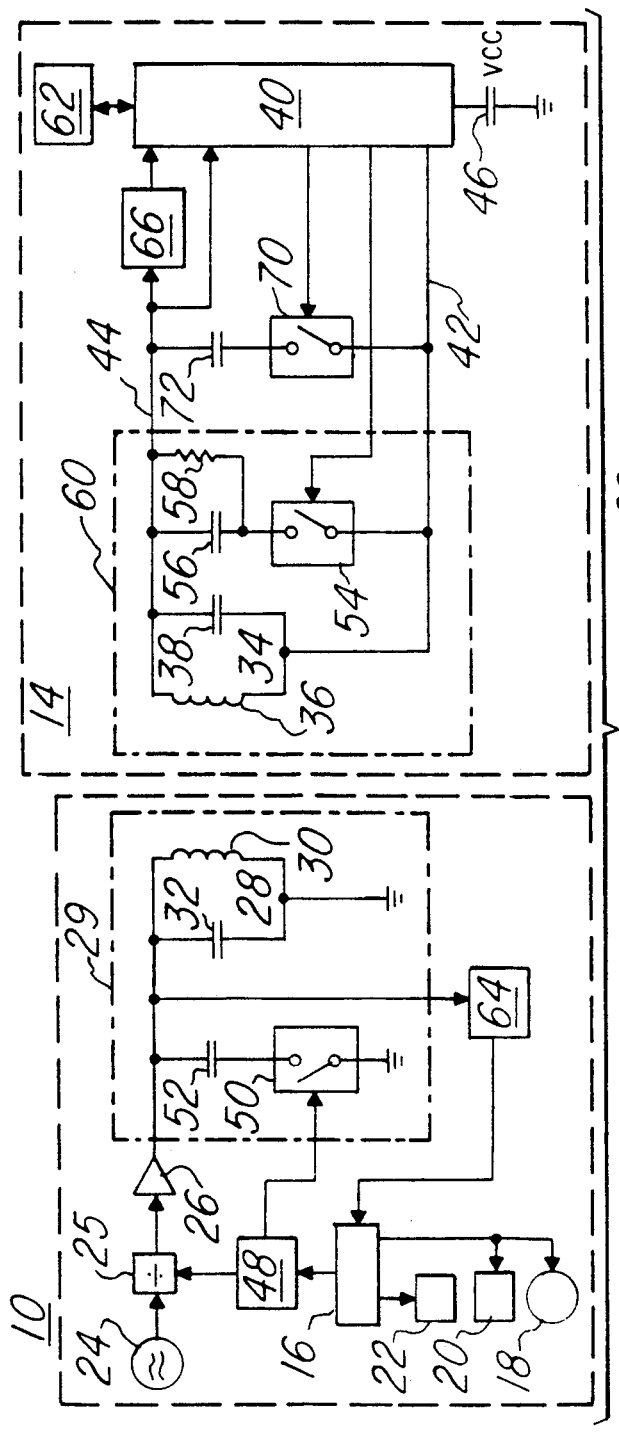
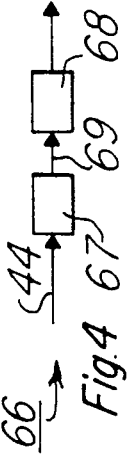
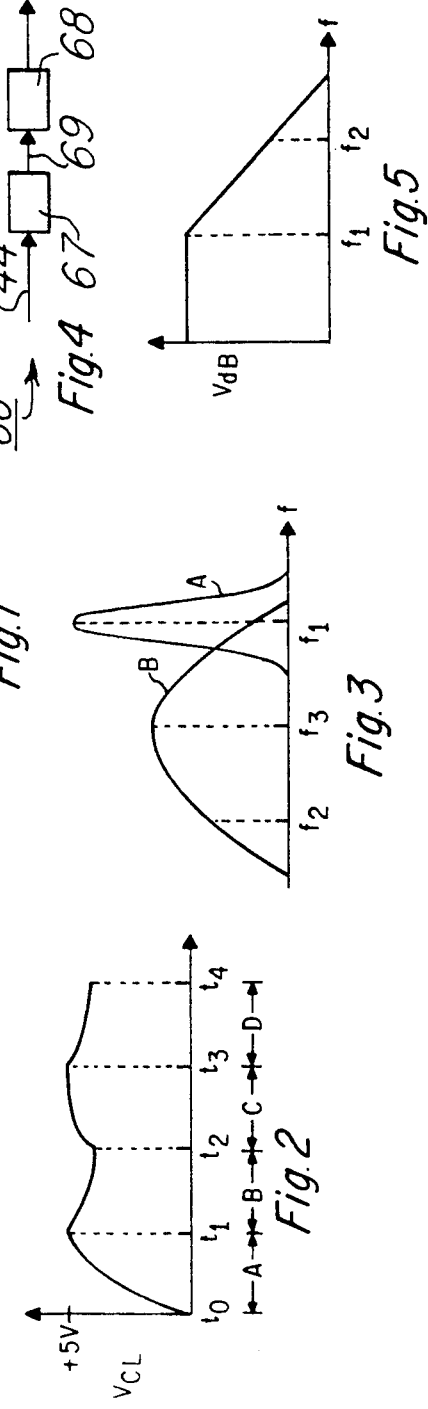

5,287,112

HIGH SPEED READ/WRITE AVI SYSTEM

CROSS-REFERENCE TO RELATED PATENTS

The following coassigned patent applications are hereby incorporated herein by reference:

| Pat No./Serial No. | Filing Date | TI Case No. |
| --- | --- | --- |
| 5,053,774 | 2/13/91 | TI-12797A |
| 07/981,635 | 11/25/92 | TI-16688 |

FIELD OF THE INVENTION

This invention generally relates to a fast read/write Radio Frequency Identification (RFID) System. A transponder is operable to receive powering signals over an antenna that is tuned with a high Q-factor to the antenna of an interrogator. The transponder preferably adapts itself for reception of FSK communications from the interrogator by sideband detuning of its antenna, thus facilitating reception of FSK communications having a wide frequency band relative to the narrow band powering signal.

BACKGROUND OF THE INVENTION

Heretofore, in this field, a powering antenna has often been provided with the interrogator in addition to the communicating antenna. This powering antenna is provided for the powering of a transponder not having its own internal power supply. The powering antenna may be a high Q-factor antenna to effect maximum power transfer to the transponder. Because of the flexibility afforded by having a spearate power antenna in the interrogator which may be optimized for power transfer to the transponder, the transponder antenna may be optimized for communicating with the interrogator's communicating antenna. An example of this type of system is given in U.S. Pat. No. 4,550,444 by Uebel and in U.S. Pat. No. 4,912,471 by Tyburski et al. In such systems the RF coupling can be separately designed for the power transfer link and the communications link. The disadvantage in such a system is the inherently greater cost and size involved in a transponder having two separate circuits for powering and communicating. Another known technique allowing for somewhat optimized powering and communication links is to provide separate transmit and receive antennas in the transponder. In this way the downlink (i.e., the communication link from the interrogator to the transponder) can be designed for efficient power transfer. Because the transponder is desirably compact and power-efficient, the uplink (i.e., the communication link from the transponder to the interrogator) can be optimized to the transponder's transmit antenna. Communication can still be effectively carried out over the downlink because of the lesser need for power and cost efficiency in the interrogator transmitter design. An example of this type of system can be found in U.S. Pat. No. 3,713,148 by Cardullo et al. As before, the disadvantage in such a system is the inherently greater cost and size involved in a transponder having two separate circuits, this time for receiving and transmitting.

Yet another known technique is described in U.S. Pat. No. 5,053,774 by Schuermann, et al. In this technique, communication and power transfer is preferably accomplished by a single resonant circuit in each of the interrogator and the transponder thereby minimizing cost, size and power efficiency. The resonant circuit in each of the interrogator and the transponder is used for both communication and power transfer in this prior art. For optimal power transfer the prior art device uses highly tuned, high Q-factor resonant circuits.

Generally in prior art circuits using highly tuned, high Q-factor resonant circuits for communication, the preferred modulation technique is 100% amplitude shift keying (ASK) modulation or another modulation technique where the frequency is not modulated (e.g., PSK, QPSK). These modulation techniques allow the link to continue to operate within its tuned frequency. The modulation percentage in ASK refers to the percentage by which the amplitude of the carrier is reduced from its maximum. For example, On-Off Keying (OOK), also called 100% ASK, means that one logic level will be represented by maximum carrier while the other logic level will be represented by an absence of a carrier. Further illustrating, 50% ASK means that one logic level will be represented by maximum carrier while the other logic level will be represented by a carrier having an amplitude of 50% of maximum.

The reason that frequency shift keying (FSK) is difficult to use for communicating between two highly tuned, high Q-factor resonant circuits is that the power transfer between two high Q-factor resonant circuits drops off rapidly as the carrier frequency deviates from the tuned frequency. Inherently the carrier frequency within FSK modulation deviates from the tuned frequency. ASK modulation can be used with high Q-factor tuned circuits and where high data transmission speed is not the primary consideration. Within a high Q-factor circuit, however, the ringing of the resonant circuit takes a significant time period to subside, thereby limiting the data transfer rate. Ringing can be reduced by reducing the modulation percentage or reducing the Q-factor.

SUMMARY OF THE INVENTION

The preferred embodiment of the present invention overcomes the difficulties described above in that it allows the use of a single set of circuitry in each of the interrogator and the transponder for transmission and reception of both powering and communication signals. In the preferred embodiment, as in the '774 patent by Schuermann, a single resonant circuit is implemented in each of the interrogator and the responder for maximum efficiency of cost, size, and power consumption. The preferred embodiment of the present invention, however, also provides a circuit and method for using other than ASK or PSK modulation for both the uplink and the downlink. Preferably FSK is used for both the uplink and the downlink transmissions allowing higher data transmission speeds. The conflicting needs for efficient power transfer and fast FSK communication are met in preferred embodiments of the present invention. First the interrogator sends a powering burst to the transponder during which the interrogator and transponder are tuned with high Q-factor resonant circuits. The interrogator then begins to transmit WRITE data to the transponder using FSK modulation. The transponder then adapts itself to receive the larger bandwidth FSK signal by damping (i.e., lowering the Q-factor) of its tuned circuit. The transponder's tuned circuit preferably is tuned to the center of the FSK frequencies. The data transfer rates achieved using FSK modulation exceeds that using other modulation techniques. Yet other advantages provided by the present invention include greater data security owing to the greater complexity and redundancy of decoding FSK signals and the lesser sensitivity to the Q-factor of the resonant circuits.

BRIEF DESCRIPTION OF THE DRAWINGS

In the drawings:

FIG. 1 is a block circuit diagram of the preferred system embodiment;

FIG. 2 is a graph of the transponder power supply voltage, $V_{CL}$, vs. time;

FIG. 3 is a frequency spectrum illustrating the power spectrums for the highly tuned and detuned configurations of the transponder (graphs A and B, respectively);

FIG. 4 is a block circuit diagram of a preferred FSK demodulation circuit; and

FIG. 5 is a frequency spectrum illustrating the filter characteristics of the slope detector of FIG. 4.

DETAILED DESCRIPTION OF PREFERRED EMBODIMENTS

FIG. 1 shows a transponder arrangement 10 comprising an interrogator 12 and a responder or transponder 14. The interrogator 12 preferably comprises a control circuit 16 which controls the actions of the interrogator circuitry. The control circuit 16 causes the modulator 48 to generate either the powering frequency $f_1$ or a second frequency $f_2$. In the illustrated embodiment the second frequency $f_2$ is used to represent one state of the WRITE data while the powering frequency $f_1$ is used during data transmission to represent the other state of the WRITE data. This FSK keying is accomplished by control circuit 16 controlling modulator 48 to open and close a switch 50 thereby changing the resonant frequency of the resonant circuit 28. The modulator 48 further changes the division factor of the programmable divider 25 to divide the reference carrier by a selectable ration ($n_1$, $n_2$) to one of two selectable frequencies ($f_1$, $f_2$). When the switch 50 is open, the resonant circuit 28 oscillates at frequency $f_1$. When the switch 50 is closed and the capacitor 52 is connected in parallel, the resonant circuit 28 resonates [at frequency $f_2$. The interrogator 12 might be a standalone unit, or alternatively, might be connected by a host connection 18 to a host computer. The control circuit 16 is preferably connected to a memory 20 that is operable to maintain, among other things, a list of instructions for the control circuit 16 to execute, information regarding various transponders 14 and groups of transponders for addressing. The memory 20 is also operable to receive information written to it by control circuit 16. This information may be gained from inquiries of the transponder 14 and may include data and addresses returned by the transponder 14. Yet another component preferably operating under the control of the control circuit 16 is a display 22 that may visually express to a user the results of an interrogation or communicate status information.

Referring now to FIG. 2, a graph is shown of the relative transponder operating voltage $V_{CL}$ on the vertical scale and time on the horizontal scale. The vertical scale is in volts, with the preferred operating voltage $V_{CL}=5V$. No units are provided for the horizontal scale as the figure is intended solely to provide information regarding the general operational characteristics of the communication between the transponder 14 and interrogator 12. As shown on the graph of FIG. 2, the preferred communications protocol has four phases.

The first phase is the Powering phase or phase "A" and lasts from time $t_0$ to $t_1$. The second phase is the Downlink phase or phase "B" and lasts from time $t_1$ to $t_2$. The third phase is the Memory Write phase or phase "C" and lasts from time $t_2$ to $t_3$. The fourth phase is the Uplink phase or phase "D" and lasts from time $t_3$ to $t_4$. The number of phases and the actions undergone during them is to illustrate one embodiment contemplated by the inventor. Various modifications and combinations of the phases, also other embodiments of the invention, will be apparent to persons skilled in the art upon reference to the description. It is therefore intended that the appended claims encompass any such modifications or embodiments.

FIG. 3 is a frequency spectrum illustrating the power spectrums for the highly tuned and detuned configurations of the transponder (graphs A and B, respectively). Now that the phases and frequency spectrums have been named and listed and an overview of the main components of the transponder system has been described, the remaining components and their uses during each phase will be described.

Again referring to FIG. 1, now together with FIG. 2 and FIG. 3, the remaining components, timing, and frequency spectrum of the preferred embodiment will be described. During the "A" phase, within the interrogator 12 a carrier wave generator 24 operates to provide a reference frequency to a programmable divider 25. A buffer or amplifier 26 receives a divided carrier having a first or second frequency, $f_1$ or $f_2$, from the programmable divider 25 and passes the signal to an interrogator tuned circuit 28. Tuned circuit 28 is preferably tuned to $f_1$ although it is well known that a harmonic of the resonant frequency $f_1$ or another frequency could be used if design needs dictated. In this embodiment, the modulator 48 further acts to select the resonant frequency of the tuned circuit 28 to coincide with the corresponding frequency selected by the modulator 48 using the programmable divider 25. The mechanism that modulator 48 uses to select the resonant frequency of tuned circuit 28 is a switch 50 that is open or closed depending on the output of modulator 48. The tuned circuit 28 preferably comprises the parallel combination of a coil 30 and a capacitor 32. The switch 50 when closed forms a parallel connection of another capacitor 52 across tuned circuit 28 thus lowering the resonant frequency of resonant circuit 28 to $f_2$. A series resonant circuit could also be used as tuned circuit 28 if the amp 26 is to drive a low impedance tuned circuit (e.g., a series resonant circuit). The oscillation of this tuned circuit 28 transmits RF energy that is received by the transponder 14. A transponder resonant circuit 34 that also is tuned ideally to $f_1$ receives this energy. The transponder resonant circuit 34 preferably comprises the parallel combination of a coil 36 and a capacitor 38. A transponder control circuit 40 is connected to this resonant circuit 34 at a reference connection 42 and at a signal connection 44. The control circuit 40 receives its energy from the resonant circuit 34, rectifies the received signals, and stores the energy on a storage capacitor 46. The mechanisms for rectifying signals and storing energy are well known to one of ordinary skill in the art. Examples of circuitry for performing these functions can be found in U.S. Pat. No. 5,053,774, incorporated by reference in this application.

During the "B" phase the control circuit 16 sends data to a modulator 48. An FSK modulator 48 under direction of control circuit 16 operates to control programmable frequency divider 25 to pass either a first frequency, $f_1$, or a second frequency, $f_2$, on to buffer/amplifier 26. The frequencies $f_1$ and $f_2$ are selected submultiples of the reference frequency. The carrier wave generator 24 is preferably a crystal oscillator. As an example, one polarity of the WRITE data might be the reference carrier divided by ratio $n_1$ ($f_1$), while the other polarity of the WRITE data might be represented by another frequency that is the reference carrier divided by ratio $n_2$ ($f_2$). The modulator 48 controls a switch 50 that can connect a capacitor 52 in parallel with tuned circuit 28.

Connecting the capacitor 52 in parallel with this tuned circuit 28 forms a new tuned circuit 29 with a new, lower resonant frequency $f_2$. By opening and closing switch 50 in synchronism with the control of programmable divider 25 the resonant circuit 28 or new resonant circuit 29 remains optimally tuned to the transmitted frequencies $f_1$ and $f_2$. By choosing $f_1$ to represent one logic level and $f_2$ to represent another it is possible to transmit information from the interrogator 12 to the transponder 14. Data is received in the transponder 14 by the transponder's resonant circuit 34. A downlink signal is passed on to demodulator 66 that in turn transmits a received data stream to the control circuit 40. The received WRITE data is typically FSK demodulated by the demodulator 66. Techniques and circuits for FSK demodulation are well known in the art.

An illustrative FSK demodulation circuit 66 is shown in FIG. 4. In this circuit, a filter 67 is provided to receive the downlink signal on signal line 44. This filter 67 may be either a lowpass or a highpass filter which acts as a slope detector where the FSK signal is converted to an ASK signal. The slope detector operates by having each of the FSK frequencies ($f_1$, $f_2$) lie on the filter roll-off so the amplitude of the output will be different depending on the input FSK frequency. The signal on line 69 corresponding to the output of the filter is shown in FIG. 5. FIG. 5 shows a frequency plot of the rolloff of filter 67 with the position of $f_1$ and $f_2$ shown on the frequency (horizontal) scale. As can be seen from FIG. 5, a different amplitude corresponds on the vertical scale with each of the different FSK frequencies. An AM demodulator 68 receives this amplitude modulated signal and provides a data signal or WRITE signal to the control circuit 40.

In order for the transponder resonant circuit 34 to be properly tuned to the FSK modulated signal from the interrogator 12, the control circuit 40 closes a switch 54 that connects a capacitor 56 and a resistor 58 in parallel with the resonant circuit 34 to form a new resonant circuit 60. The effect of this is to lower the frequency of the resonant circuit to $f_3$ from $f_1$, where $f_3$ is the central frequency between the two FSK carriers $f_1$ and $f_2$. In order for the new resonant circuit 60 that is the parallel combination of the capacitors 34,56 and coil 36 to have a sufficient bandwidth to take in both FSK carriers $f_1$ and $f_2$, the resonant circuit 60 is damped by the resistor 58.

The effect of these changes is shown in FIG. 3. Graph A shows the frequency response of the resonant circuits 28,34. Because these resonant circuits 28,34 have a high Q, the graph has a very narrow base and a high peak. Graph B shows the effect on resonant circuit 34 in closing switch 54 to form new resonant circuit 60. Graph B is centered at $f_3$ between $f_1$ and $f_2$ and has a broad base which does have a significant frequency response at both $f_1$ and $f_2$. Because the resonant circuits 28,60 are no longer tightly coupled during phase "B" the energy transmission from the interrogator 12 to the transponder 14 is reduced. Thus, the storage capacitor 46 must supply energy to the transponder circuitry for the transponder 14 to remain operational. As shown in FIG. 2, the storage capacitor 46 voltage $V_{CL}$ drops during this phase as it supplies this energy to the transponder circuitry. As an option at the end of this phase a short handshake can be added to verify data reception without bit errors.

Referring to FIG. 1, upon receipt and demodulation of the downlink signal the control circuit 40 during phase "C" writes to memory 62. In some embodiments phase "C" may be optional. However, even if memory 62 is not written to during this phase, this phase may be used to restore energy to the storage capacitor 46. In the instance where phase "C" is used to restore the storage capacitor 46, the interrogator 12 again opens switch 50 such that the tuned circuit 28 again resonates at $f_1$. The transponder opens switch 54 such that the resonant circuit 34 again resonates with a high Q at $f_1$ and maximum transmission of power from the interrogator to the responder can resume. Since the storage capacitor 46 is presumably not fully discharged the time required to charge is greatly reduced. The time required is on the order of 15-20% of the original powering time.

Again referring to FIG. 1, during phase "D" interrogator tuned circuit 28 is damped to enable downlink FSK reception. Phase "D" also is an optional phase, since a transponder response or unlink might not be necessary in all instances. In the event that reception of a transponder response or uplink is desired, the interrogator tuned circuit 28 might be damped by the control circuit 16 by disabling the carrier wave generator 24 and by shunting a switch/resistor series combination across the resonant circuit. This damping of the carrier wave generator 24 is described in the '774 patent by Schuermann et al. Once the oscillation of resonant circuit 28 is damped, the interrogator 12 is free to receive signals from the transponder 14. Within the transponder 14, the resonant circuit 34 continues to oscillate until the energy stored therein is dissipated. The transponder 14 can now respond to the interrogator 12 by using a switch 70 to connect another capacitor 72 across the resonant circuit 34. Now in the transponder's 14 response to the interrogator 12 READ data is represented upon the uplink signal by a first frequency that might be the resonant frequency of resonant circuit 34 and by a second frequency that might be the resonant frequency of capacitor 72 in parallel with resonant circuit 34. Thus, the first frequency might represent the transmission from the transponder to the interrogator of a digital ZERO and the second frequency might represent the transmission of a digital ONE. This uplink is then demodulated by the interrogator demodulator 64 and supplied to control circuit 16 that may store the data in memory 20, transmit the data to a host via the connection 18, or display status information or data to an operator on a display 22.

The sole table, below, provides an overview of the embodiments and the drawings:

TABLE

| Drawing Element | Generic Term | Preferred or Specific Term | Alternate Terms |
|---|---|---|---|
| 10 | Transponder Arrangement | | |

TABLE-continued

| Drawing Element | Generic Term | Preferred or Specific Term | Alternate Terms |
|---|---|---|---|
| 12 | Interrogator | Interrogator | Reader |
| 14 | Transponder | Transponder | Responder, Tag |
| 16 | Control Circuit | Interrogator Control Circuit | |
| 18 | Connection | Host Computer Connection | |
| 20 | Memory | Interrogator Memory | SRAM, DRAM, EEPROM |
| 22 | Display | | LCD, CRT, LED display, VF display |
| 24 | Carrier Wave Generator | Carrier Wave Generator | Oscillator, Crystal Oscillator |
| 26 | Buffer | Buffer/Amplifier | |
| 28 | Resonant Circuit | Interrogator $f_1$ Resonant circuit | Antenna |
| 30 | Coil | | |
| 32 | Capacitor | | |
| 34 | Resonant Circuit | Transponder $f_1$ Resonant Circuit | Antenna |
| 36 | Coil | | |
| 38 | Capacitor | | |
| 40 | Control Circuit | Transponder Control Circuit | Microprocessor, Microcontroller |
| 42 | Reference Line | Reference Voltage | Reference Voltage Connection |
| 44 | Signal Line | Signal Line | Reference Signal Connection |
| 46 | Energy Storage Device | Storage Capacitor | Rechargeable Battery |
| 48 | Modulator | FSK Modulator | |
| 50 | Switch | | |
| 52 | Resonant Circuit | Interrogator $f_2$ Resonant Circuit | |
| 54 | Switch | | |
| 56 | Capacitor | | |
| 58 | Damping Element | Resistor | |
| 60 | Resonant Circuit | Transponder $f_3$ Resonsant Circuit | |
| 62 | Memory | Transponder Memory | EEPROM, SRAM, ROM |
| 64 | Demodulator | Interrogator Demodulator | |
| 66 | Demodulator | FSK Demodulator | PLL FSK Demodulator |
| 67 | Slope Detector | Filter | Lowpass Filter, Highpass Filter |
| 68 | Demodulator | Transponder Demodulator | AM Demodulator (w/High or Lowpass filter) |
| 69 | Signal Line | Slope Detector Output | |
| 70 | Switch | Transponder Modulator Switch | |
| 72 | Capacitor | Transponder Modulator Capacitor | |

A few preferred embodiments have been described in detail hereinabove. It is to be understood that the scope of the invention also comprehends embodiments different from those described, yet within the scope of the claims.

For example, "microcomputer" is used in some contexts to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A transponder for communicating with an interrogator unit, said transponder comprising:
   a) a high Q-factor resonant circuit of frequency $f_1$ for receiving RF powering signals;
   b) a tuning circuit which when in electrical communication with said resonant circuit is operable to form a lower Q-factor resonant circuit of frequency $f_3$ for receiving RF communications from said interrogator unit;
   c) a control circuit which is in electrical communication with said high Q-factor resonant circuit and said tuning circuit and is operable to connect said tuning circuit to said high Q-factor resonant circuit in order to form said lower Q-factor resonant circuit, said control circuit further operable to convert said RF powering signals to a DC current for storing energy, said control circuit still further operable to demodulate signals received by said lower Q-factor resonant circuit; and
   d) an energy storage device for storing the energy received in said DC current from said control circuit.

2. The transponder of claim 1 wherein frequency $f_1$ is the same as $f_3$.

3. The transponder of claim 1 wherein said energy storage device is a storage capacitor.

4. The transponder of claim 1 wherein said energy storage device is a rechargeable battery.

5. The transponder of claim 1 wherein said high Q-factor resonant circuit comprises the parallel combination of a coil and a capacitor.

6. The transponder of claim 5 wherein said tuning circuit comprises a capacitor whose parallel combination with said high Q-factor resonant circuit forms said lower Q-factor resonant circuit having said resonant frequency $f_3$ being lower than said resonant frequency $f_1$.

7. The transponder of claim 6 wherein said tuning circuit comprises a damping resistor for lowering the Q-factor of said resonant circuit in combination with said tuning circuit.

8. The transponder of claim 1 wherein said high Q-factor resonant circuit continues to oscillate in absence of said RF powering signals.

9. The transponder of claim 8 and further comprising a modulator which is operable to modulate the continued oscillations of said high Q-factor resonant circuit with data provided to said modulator by said control circuit.

10. An interrogator for communicating with a transponder, said interrogator comprising:
   a) a programmable carrier wave generator capable of providing a carrier of a first frequency, $f_1$, or a second frequency, $f_2$;
   b) a first resonant circuit having a resonant frequency of said first frequency, $f_1$;
   c) a tuning circuit which when in electrical communication with said resonant circuit is operable to form a second resonant circuit having a resonant frequency of said second frequency, $f_2$; and
   d) a modulator which is in electrical communication with said tuning circuit and said programmable carrier wave generator, said modulator operable to toggle the frequency of said carrier wave generator in response to a received data stream and to synchronously enable or disable said tuning circuit such that when said programmable carrier wave generator is providing frequency $f_1$, said tuning circuit is disabled and said first resonant circuit is tuned to said resonant frequency, $f_1$, and when said programmable carrier wave generator is providing frequency, $f_2$, said tuning circuit is enabled and said second resonant circuit is tuned to said resonant frequency, $f_2$.

11. The resonant frequency of claim 10 wherein said programmable carrier wave generator comprises a carrier wave generator and a programmable divider whereby said first and second carrier frequencies are generated by said programmable divider as submultiples of said reference carrier under direction from said modulator.

12. The transponder of claim 10 wherein said tuning circuit comprises a capacitor whose parallel combination with said first resonant circuit forms said second resonant circuit having said second carrier frequency.

13. The transponder of claim 12 wherein said tuning circuit is enabled by providing a switch under control of said modulator in series with said capacitor, the series combination of said switch and said capacitor being parallel to said first resonant circuit.

14. A method for communicating between an interrogator and a transponder, said method comprising the steps of:
   a) sending by said interrogator a powering signal from a first high Q-factor resonant circuit having a resonant frequency of $f_1$;
   b) receiving by said transponder said powering signal on a second high Q-factor resonant circuit having a resonant frequency of $f_1$;
   c) receiving by a transponder control circuit said powering signal from said second high Q-factor resonant circuit;
   d) storing energy from said powering signal in an energy storage device;
   e) connecting by said transponder control circuit a tuning circuit to said second high Q-factor resonant circuit to form a lower Q-factor resonant circuit having a resonant frequency of $f_3$;
   f) transmitting by said interrogator unit a FSK-modulated communicating signal with a center frequency of $f_3$, said FSK-modulated communicating signal having an occupied frequency spectrum which falls substantially within the frequency response of the lower Q-factor resonant circuit, said communicating signal generated by modifying the resonant frequency of said first high Q-factor resonant circuit;
   g) receiving by said transponder lower Q-factor resonant circuit said FSK-modulated communicating signal;
   h) demodulating by said transponder control circuit said FSK modulated communicating signal;
   i) disconnecting by said transponder control circuit said tuning circuit to re-establish said second high Q-factor resonant circuit; and
   j) responding to said interrogator by said transponder by modulating said second high Q-factor resonant circuit.

15. The method of claim 8 and further comprising the step of sending another powering signal to said transponder prior to said responding step.

16. The method of claim 9 and further comprising the step of writing by said transponder control circuit to a transponder memory simultaneously with said step of sending another powering signal.

* * * * *